United States Patent
Okamoto et al.

(10) Patent No.: US 11,534,880 B2
(45) Date of Patent: Dec. 27, 2022

(54) CONTROL APPARATUS OF MACHINE TOOL INCLUDING SPINDLE AXIS AND FEED AXIS

(71) Applicant: FANUC CORPORATION, Yamanashi (JP)

(72) Inventors: Takashi Okamoto, Yamanashi (JP); Yuuki Morita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 345 days.

(21) Appl. No.: 16/841,559

(22) Filed: Apr. 6, 2020

(65) Prior Publication Data

US 2020/0316743 A1  Oct. 8, 2020

(30) Foreign Application Priority Data

Apr. 8, 2019  (JP) .............................. JP2019-073689

(51) Int. Cl.
*B23Q 17/09* (2006.01)
*B23Q 15/013* (2006.01)

(52) U.S. Cl.
CPC ....... *B23Q 17/0961* (2013.01); *B23Q 15/013* (2013.01)

(58) Field of Classification Search
CPC . G05B 19/4163; B23Q 15/08; B23Q 17/0961

USPC ............................................. 318/560; 408/10
See application file for complete search history.

(56) References Cited

U.S. PATENT DOCUMENTS

| | | | | |
|---|---|---|---|---|
| 6,291,959 B1 * | 9/2001 | Yoshida | ............... | G05B 19/404 318/567 |
| 9,174,318 B2 * | 11/2015 | Inagaki | .................. | B23Q 15/08 |
| 10,088,828 B2 * | 10/2018 | Kawai | ................ | G05B 19/4062 |

FOREIGN PATENT DOCUMENTS

| | | |
|---|---|---|
| JP | H7-51992 A | 2/1995 |
| JP | H751991 A | 2/1995 |
| JP | H775936 A | 3/1995 |
| JP | H7-195256 A | 8/1995 |
| JP | 201693040 A | 5/2016 |
| JP | 2016-140967 A | 8/2016 |
| WO | 0238332 A1 | 5/2002 |
| WO | 2018/092221 A1 | 5/2018 |

* cited by examiner

*Primary Examiner* — David Luo
(74) *Attorney, Agent, or Firm* — Hauptman Ham, LLP

(57) ABSTRACT

A control apparatus of a machine tool including a feed axis, which is driven by a feed axis motor, includes a load torque estimation unit configured to estimate a load torque acting on a spindle motor, based on a torque command to the spindle motor which drives a spindle axis of the machine tool, and a speed of the spindle motor; and a speed control unit configured to control a speed of a feed axis motor such that the load torque estimated by the load torque estimation unit follows a prescribed load torque target value.

3 Claims, 5 Drawing Sheets

CONTROL APPARATUS OF MACHINE TOOL INCLUDING SPINDLE AXIS AND FEED AXIS

RELATED APPLICATIONS

The present application claims priority to Japanese Application Number 2019-073689, filed Apr. 8, 2019, the disclosure of which is hereby incorporated by reference herein in its entirety.

BACKGROUND OF THE INVENTION

1. Field of the Invention

The present invention relates to a control apparatus of a machine tool including a spindle axis and a feed axis.

2. Description of the Related Art

In general, in a machine tool, a spindle axis to which a tool is attached is driven by a spindle motor, and a feed axis, which moves the spindle axis relative to a work (an object to be processed), is driven by a feed axis motor. During the processing by the machine tool, since the tool receives reaction force from the work with which the tool is in contact, a load torque (spindle axis disturbance load) acting on the spindle motor varies. The load torque acting on the tool provided on the spindle axis varies depending on, for instance, the speed of the feed axis of the tool relative to the work, or the state of contact between the tool and the work. In order to enhance the efficiency of processing, it is conceivable to increase the speed of the feed axis. However, if the feed speed is excessively increased, the load torque acting on the spindle motor that drives the spindle axis, on which the tool is provided, increases, and there is a possibility that the tool is broken or abnormality occurs in the work. Conversely, by decreasing the speed of the feed axis, the load torque acting on the spindle motor can be decreased, but there is a defect that the processing efficiency of the machine tool lowers. Therefore, it is preferable to properly adjust the load torque acting on the spindle motor.

For example, as disclosed in Japanese Unexamined Patent Publication No. H07-051992, there is known a boring processing method of opening a bore in a work by using a drill, the boring processing method being characterized by including spindle axis cutting load estimation means for estimating a cutting load torque of a spindle axis which rotates and drives the drill; spindle axis cutting load monitoring means for determining and monitoring whether the estimated cutting load torque by the spindle axis cutting load estimation means reaches a predetermined torque or more; and spindle axis and feed axis control means for executing driving control of the spindle axis and a feed axis of the drill, based on a monitoring result of the spindle axis cutting load monitoring means.

For example, as disclosed in Japanese Unexamined Patent Publication No. H07-195256, there is known a control apparatus which is used in a machine tool including a spindle axis rotation mechanism that rotates a tool detachably attached to a tip end thereof and a feed mechanism that moves the spindle axis rotation mechanism forward and backward relative to a work, and which controls a feed speed of the feed mechanism, the control apparatus including torque detection means for detecting a torque applied to the tool; feed speed calculation means for calculating the feed speed, based on at least a torque target value that is set, and the torque detected by the torque detection means; and feed mechanism control means for receiving an output of the feed speed calculation means and controlling the feed mechanism such that the feed speed becomes the calculated feed speed.

For example, as disclosed in Japanese Unexamined Patent Publication No. 2016-140967, there is known a position control apparatus which controls, according to a position command value from an upper-level apparatus, a position of a control target of a numerically controlled machine that drives a load by using a servomotor, the position control apparatus including a controller which outputs an operation amount, based on the position command value and a position detection value of the control target acquired from a position detector; an adder which outputs a control input by adding the operation amount and a compensation amount; means for driving the control target according to the control input; a disturbance observer which acquires a disturbance estimation value by inputting to a low-pass filter a difference between a value, which is calculated by multiplying the position detection value by an inverse characteristic of a nominal value of the control target, and the control input; and an amplitude phase corrector which calculates the compensation amount from the disturbance estimation value and a cutting vibration frequency, wherein the amplitude phase corrector calculates a gain correction coefficient from a gain characteristic of the low-pass filter in the cutting vibration frequency, calculates a phase correction value from a phase characteristic of the low-pass filter in the cutting vibration frequency, and performs gain correction and phase correction of the disturbance estimation value, based on the gain correction coefficient and the phase correction value.

For example, as disclosed in International Publication No. 2018/092221, there is known a feed axis control method of a machine tool including a position control unit to which a position command is input, a speed control unit to which a speed command is input from the position control unit, and a servo amplifier which generates a current for driving the feed axis of the machine tool, based on a torque command that is input from the speed control unit, the feed axis control method including detecting a vibration acceleration of a tip end portion of the machine tool; performing frequency analysis of the vibration acceleration and specifying a central frequency of vibration; setting a frequency of a band-pass filter, based on the central frequency; and feeding a vibration acceleration of the frequency, which is set in the band-pass filter, back to the servo amplifier.

SUMMARY OF INVENTION

In order to consistently achieve both the avoidance of breakage of a tool and occurrence of abnormality of a work due to an increase of a load torque on a spindle motor and the enhancement of processing efficiency of a machine tool, it is important to properly adjust the load torque acting on the spindle motor.

For example, a control method is conceivable, in which the speed of a feed axis motor that drives a feed axis is controlled according to a spindle axis torque command, thereby adjusting a load torque acting on a spindle motor to a desired value. However, the spindle axis torque command is generated in accordance with a load torque (spindle axis disturbance load), which is based on reaction force that a tool receives from a work, and an acceleration/deceleration torque on the spindle motor. Under such control of the feed speed of the feed axis motor according to the spindle axis torque command, when the speed of the spindle motor greatly varies by the influence of the variation of the load torque, the load torque acting on the spindle motor deviates from a desired value during a transition time of the variation, and it is not possible to properly adjust the load torque.

Accordingly, in a machine tool including a spindle axis which is driven by a spindle motor and a feed axis which is driven by a feed axis motor, there is a demand for a control apparatus which can keep a load torque on the spindle motor at a desired value.

According to one aspect of the present disclosure, a control apparatus of a machine tool includes a load torque estimation unit configured to estimate a load torque acting on a spindle motor, based on a torque command to the spindle motor which drives a spindle axis, and a speed of the spindle motor; and a speed control unit configured to control a speed of a feed axis motor such that the load torque estimated by the load torque estimation unit follows a prescribed load torque target value.

BRIEF DESCRIPTION OF THE DRAWINGS

The present invention will be more clearly understood with reference to the following accompanying drawings.

DETAILED DESCRIPTION

Figure 1:
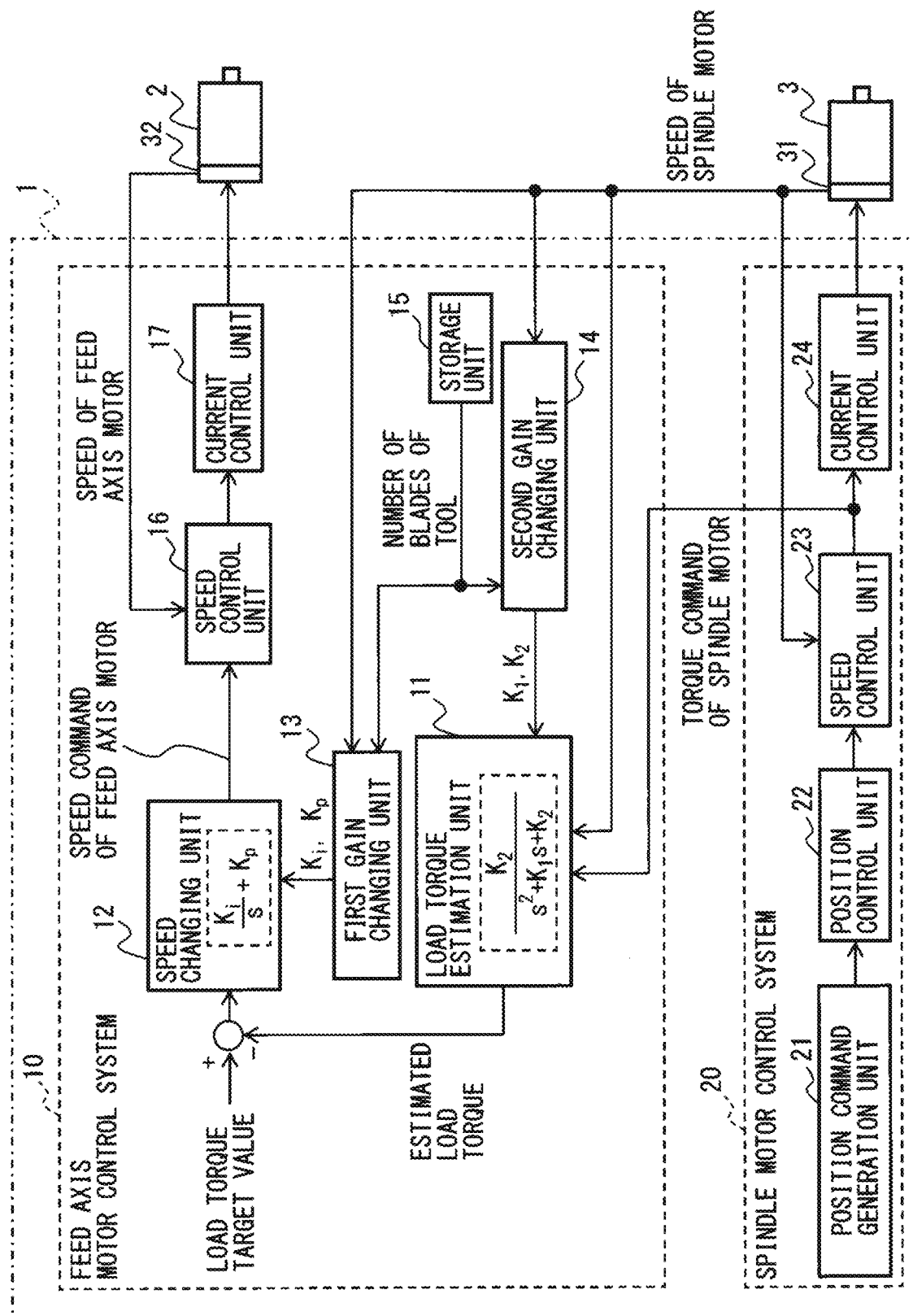
FIG. 1 is a block diagram illustrating a control apparatus of a machine tool according to one embodiment of the present disclosure.

Hereinafter, a control apparatus of a machine tool including a spindle axis and a feed axis will be described with reference to the drawings. For the purpose of easier understanding, the scale in the drawings is changed as appropriate. A mode illustrated in each drawing is an example for implementation, and is not limited to an embodiment that is illustrated.

FIG. 1 is a block diagram illustrating a control apparatus of a machine tool according to one embodiment of the present disclosure.

As illustrated in FIG. 1, according to one embodiment of the present disclosure, a control apparatus 1 of a machine tool including a spindle axis, which is driven by a spindle motor 3, and a feed axis, which is driven by a feed axis motor 2, includes a feed axis motor control system 10 and a spindle motor control system 20.

The spindle motor control system 20 is configured to control the rotation of the spindle motor 3 which drives the spindle axis on which a tool or the like is provided. The spindle motor control system 20 includes, for example, a position command generation unit 21, a position control unit 22, a speed control unit 23, and a current control unit 24. The position command generation unit 21 generates a position command to the spindle motor 3, by the control by an upper-level control apparatus (not illustrated) such as a numerical control apparatus. The position control unit 22 generates a speed command, based on the position command generated by the position command generation unit 21 and information (position feedback) relating to a rotor actual position of the spindle motor 3. The speed control unit 23 generates a torque command, based on the speed command generated by the position control unit 22 and the speed (speed feedback) of the spindle motor 3, which is detected by an encoder 31. The current control unit 24 generates a current command, based on the torque command to the spindle motor 3, which is generated by the speed control unit 23. Based on a switching command generated on the basis of the current command generated by the current control unit 24 and a current (current feedback) which flows in a motor winding of the spindle motor 3 and is detected by a current detector (not illustrated), an inverter (not illustrated) for the spindle axis ON/OFF operates a semiconductor switching element provided therein, converts DC power to AC power for motor driving, and supplies the AC power to the spindle motor 3. Thereby, the spindle motor 3 operates based on the AC power supplied from the inverter for the spindle axis. By driving the spindle motor 3, the spindle axis of the machine tool is driven. The configuration of the spindle motor control system 20, which is described here, is merely an example, and the configuration of the spindle motor control system 20 may be defined by technical terms including "torque control unit", "switching control unit", etc. Alternatively, the configuration of the spindle motor control system 20 may be defined by integrating, as appropriate, two or more of the position command generation unit 21, position control unit 22, speed control unit 23, current control unit 24, torque control unit, switching control unit, etc. Alternatively, the configuration of the spindle motor control system 20 may be defined by omitting any of the position command generation unit 21, position control unit 22, speed control unit 23, current control unit 24, torque control unit, switching control unit, etc.

The feed axis motor control system 10 is configured to control the rotation of the feed axis motor 2 which drives the feed axis that moves the spindle axis relative to the work (object to be processed). The feed axis motor control system 10 according to the present embodiment includes a load torque estimation unit 11, a speed changing unit 12, a first gain changing unit 13, a second gain changing unit 14, and a storage unit 15. The feed axis motor control system 10 further includes a speed control unit 16 and a current control unit 17.

The load torque estimation unit 11 estimates a load torque acting on the spindle motor 3, based on the torque command to the spindle motor 3 which drives the spindle axis of the machine tool, and the speed of the spindle motor 3. The load torque estimation unit 11 acquires the torque command to the spindle motor 3 from the speed control unit 23 in the spindle motor control system 20, and acquires the speed of the spindle motor 3 from the encoder 31.

Figure 2:
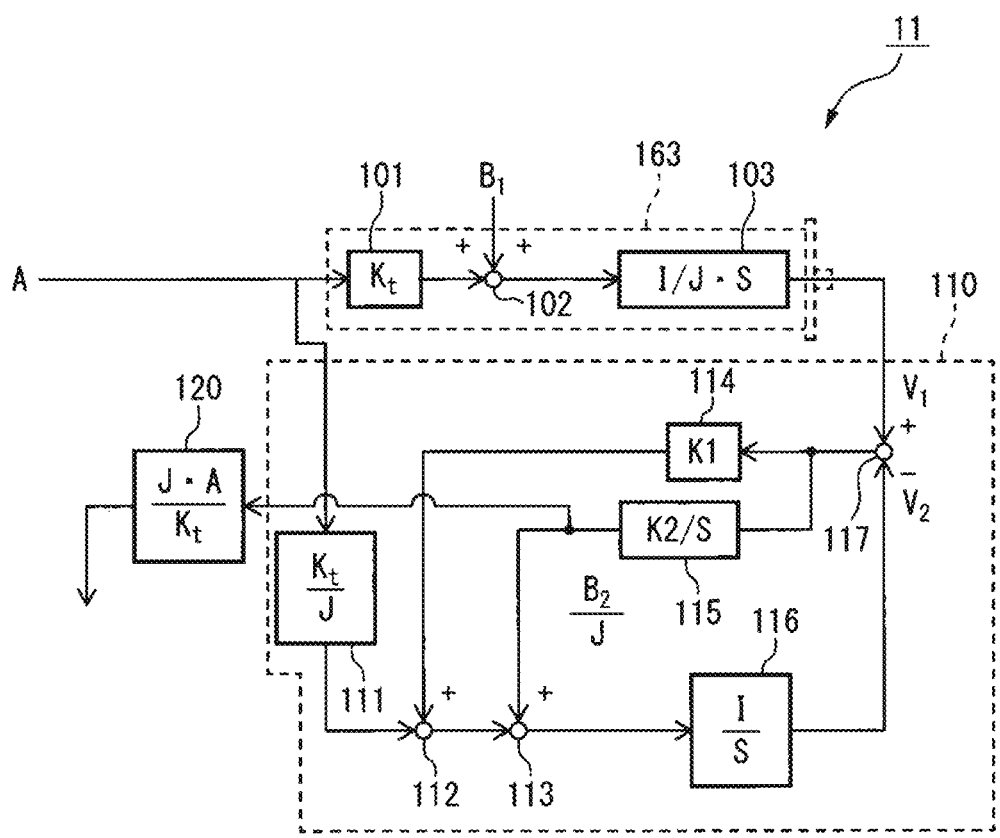
FIG. 2 is a block diagram illustrating a configuration of a load torque estimation unit in one embodiment of the present disclosure.

A configuration example of the load torque estimation unit 11 will be described. FIG. 2 is a block diagram illustrating a configuration of a load torque estimation unit in one embodiment of the present disclosure. The configuration of the load torque estimation unit 11 illustrated in FIG. 2 is merely an example, and the load torque estimation unit 11 may be realized by some other configuration.

The load torque estimation unit 11, which estimates the load torque relating to the spindle motor 3, includes an observer 110. In FIG. 2, a torque command A to the spindle motor 3 is input to an element 101 and is used to drive the spindle motor 3. A disturbance load torque $B_1$ is added to an output of the spindle motor 3 by an adder 102. When the inertia of the spindle motor 3 is J, an element 103, to which an addition result between the element 101 and the disturbance load torque $B_1$ is input, outputs a speed $V_1$ of the spindle motor 3. $K_t$ is a conversion coefficient for converting the unit of the torque command to the unit of torque.

The torque command A to the spindle motor 3 is also input to the observer 110. The observer 110 is configured to estimate a disturbance load torque, based on the torque command A to the spindle motor 3 and the actual speed (i.e. speed feedback) $V_1$ of the spindle motor 3. The torque command A to the spindle motor 3 is multiplied by "$K_t/J$" in an element 111, and is output to an adder 112. The adder 112 adds a feedback signal from an arithmetic element 114 (to be described later) to the output of the element 111. An adder 113 adds a feedback signal from an arithmetic element 115 (to be described later) to an output of the adder 112. The unit of outputs of the adder 112 and adder 113 is that of acceleration. An output of the adder 113 is input to an integrator 116, and, as a result, the integrator 116 outputs an estimated speed $V_2$ of the spindle motor 3.

A difference between the estimated speed $V_2$ of the spindle motor 3 and the actual speed $V_1$ of the spindle motor 3 is calculated by a subtractor 117, and the calculated difference is fed back to each of the arithmetic element 114 and arithmetic element 115. The arithmetic element 114 has a proportionality factor K1. The unit of the proportionality factor K1 is "$\text{sec}^{-1}$". In addition, the arithmetic element 115 has an integration constant K2. The unit of the integration constant K2 is "$\text{sec}^{-2}$".

In the load torque estimation unit 11 illustrated in FIG. 2, the actual speed (i.e. speed feedback) $V_1$ of the spindle motor 3 is expressed by equation 1 below.

[Math. 1]

$$V_1 = \frac{(K_t A + B_1)}{Js} \quad (1)$$

The estimated speed $V_2$ of the spindle motor 3 is expressed by equation 2 below.

[Math. 2]

$$V_2 = \left(\frac{K_t}{J}A + K_1(V_1 - V_2) + \frac{B_2}{J}\right)/s \quad (2)$$

A relationship of equation 3 below is established between an estimated load torque $B_2$ of the spindle motor 3 and the actual speed $V_1$ and estimated speed $V_2$ of the spindle motor 3.

[Math. 3]

$$\frac{B_2}{J} = \frac{K_2}{s}(V_1 - V_2) \quad (3)$$

From equations 1, 2 and 3, the estimated load torque $B_2$ of the spindle motor 3 is expressed by equation 4 below.

[Math. 4]

$$B_2 = \frac{K_2}{s^2 + K_1 s + K_2} B_1 \quad (4)$$

From equation 4, it is understood that the disturbance load torque $B_1$ can be estimated, like $B_2$, by the observer 110.

The above is an estimation process by the load torque estimation unit 11.

Returning to the description of FIG. 1, the speed changing unit 12 executes control to change the speed of the feed axis motor 2 in such a manner that the load torque estimated by the load torque estimation unit 11 follows a prescribed load torque target value. To be more specific, the speed changing unit 12 calculates a difference between a load torque target value, which is acquired from an upper-level control apparatus (not illustrated) such as a numerical control apparatus, and the estimated load torque acquired from the load torque estimation unit 11, and generates such a speed command to the feed axis motor 2 as to decrease the difference to zero. The speed command for changing the speed of the feed axis motor 2, which is generated by the speed changing unit 12, is sent to the speed control unit 16, and the speed (rotational speed) of the feed axis motor 2 is changed based on the speed command.

Since the speed command to the feed axis motor 2 can be changed also by changing an override, the speed changing unit 12 may generate such an override as to decrease the difference between the load torque target value and the estimated load torque to zero. In general, in the numerical control apparatus, the speed (rotational speed) can be changed by multiplying the speed command to the motor by a multiplying factor (e.g. 0 to 200%) called "override".

The speed control unit 16 generates a torque command, based on the speed command generated by the speed changing unit 12 and the speed (speed feedback) of the feed axis motor 2, which is detected by an encoder 32. The current control unit 17 generates a current command, based on the torque command to the feed axis motor 2, which is generated by the speed control unit 16. The speed control unit 16 and current control unit 17 may be constituted as one unit, and in this case the current command is generated based on the speed command generated by the speed changing unit 12 and the speed (speed feedback) of the feed axis motor 2, which is detected by the encoder 32.

Based on a switching command generated on the basis of the current command generated by the current control unit 17 and a current (current feedback) which flows in a motor winding of the feed axis motor 2 and is detected by a current detector (not illustrated), an inverter (not illustrated) for the feed axis ON/OFF operates a semiconductor switching element provided therein, converts DC power to AC power for motor driving, and supplies the AC power to the feed axis motor 2. Thereby, the feed axis motor 2 operates, based on the AC power supplied from the inverter for the feed axis. The feed axis is driven by the feed axis motor 2, and a tool 4 is moved relative to a work 5.

Figure 3:
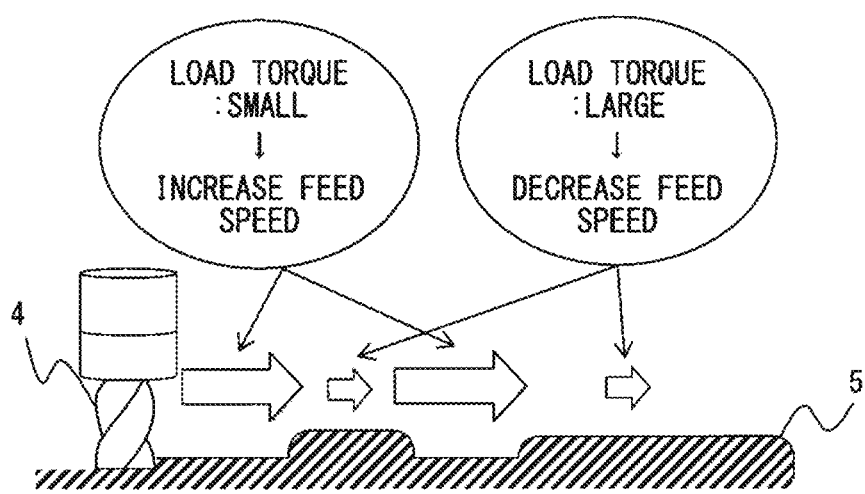
FIG. 3 is a view schematically illustrating a relationship between an estimated load torque of a spindle motor and a feed speed in one embodiment of the present disclosure.

FIG. 3 is a view schematically illustrating a relationship between an estimated load torque of a spindle motor and a feed speed in one embodiment of the present disclosure. The tool 4 for processing the work 5 is attached to the spindle axis which is driven by the spindle motor 3 (not illustrated in FIG. 3). The tool 4 attached to the spindle axis moves relative to the work 5, by the operation of the feed axis which is driven by the feed axis motor 2 (not illustrated in FIG. 3). The relative speed of the tool 4 to the work 5 is referred to as "feed speed". In the present embodiment, as the load torque (spindle axis disturbance load) estimated by the load torque estimation unit 11 becomes greater, the feed speed is made lower. In other words, when the load torque (spindle axis disturbance load) estimated by the load torque estimation unit 11 is small, the feed speed is increased, and when the load torque (spindle axis disturbance load) estimated by the load torque estimation unit 11 is large, the feed speed is decreased. The "feed speed" that is the relative speed of the tool 4 to the work 5 can be calculated by multiplying the rotational speed of the feed axis motor 2 by a predetermined conversion coefficient. The conversion coefficient is a value determined in accordance with, for instance, a structure of a feed axis mechanism which uses the feed axis motor 2 as a driving source.

A control gain, which is used for the changing of the speed of the feed axis motor 2 in the above-described speed changing unit 12, is changed by the first gain changing unit 13 in accordance with the speed of the spindle motor 3, or a frequency of processing disturbance that is a value calculated by multiplying the speed of the spindle motor 3 by the number of blades of the tool provided on the spindle axis. The details of the changing process of the control gain of the speed changing unit 12 by the first gain changing unit 13 will be described later.

In addition, a gain, which is used for the estimation of the load torque in the above-described load torque estimation unit 11, is changed by the second gain changing unit 14 in accordance with the speed of the spindle motor 3, or a frequency of processing disturbance that is a value calculated by multiplying the speed of the spindle motor 3 by the number of blades of the tool provided on the spindle axis. The details of the changing process of the gain of the load torque estimation unit 11 by the second gain changing unit 14 will be described later.

Information relating to the number of blades of the tool 4 provided on the spindle axis, which is used for the changing processes by the first gain changing unit 13 and second gain changing unit 14, is stored in the storage unit 15. The storage unit 15 is composed of, for example, an electrically erasable programmable nonvolatile memory such as an EEPROM (trademark), or a random access memory which is capable of high-speed read/write, such as a DRAM or an SRAM.

The load torque estimation unit 11, speed changing unit 12, first gain changing unit 13, second gain changing unit 14, speed control unit 16, current control unit 17, position command generation unit 21, position control unit 22, speed control unit 23 and current control unit 24 may be constituted, for example, in a software program form, or may be constituted by a combination between various kinds of electronic circuits and software programs. When the load torque estimation unit 11, speed changing unit 12, first gain changing unit 13, second gain changing unit 14, speed control unit 16, current control unit 17, position command generation unit 21, position control unit 22, speed control unit 23 and current control unit 24 are constituted in the software program form, the functions of the above-described respective units can be realized by causing arithmetic devices such as a DSP and FPGA, which are provided, for example, in a numerical control apparatus of a machine tool, to operate according to the software programs. Alternatively, the load torque estimation unit 11, speed changing unit 12, first gain changing unit 13, second gain changing unit 14, speed control unit 16, current control unit 17, position command generation unit 21, position control unit 22, speed control unit 23 and current control unit 24 may be realized as semiconductor integrated circuits in which software programs for realizing the functions of the respective units are written.

Figure 4:
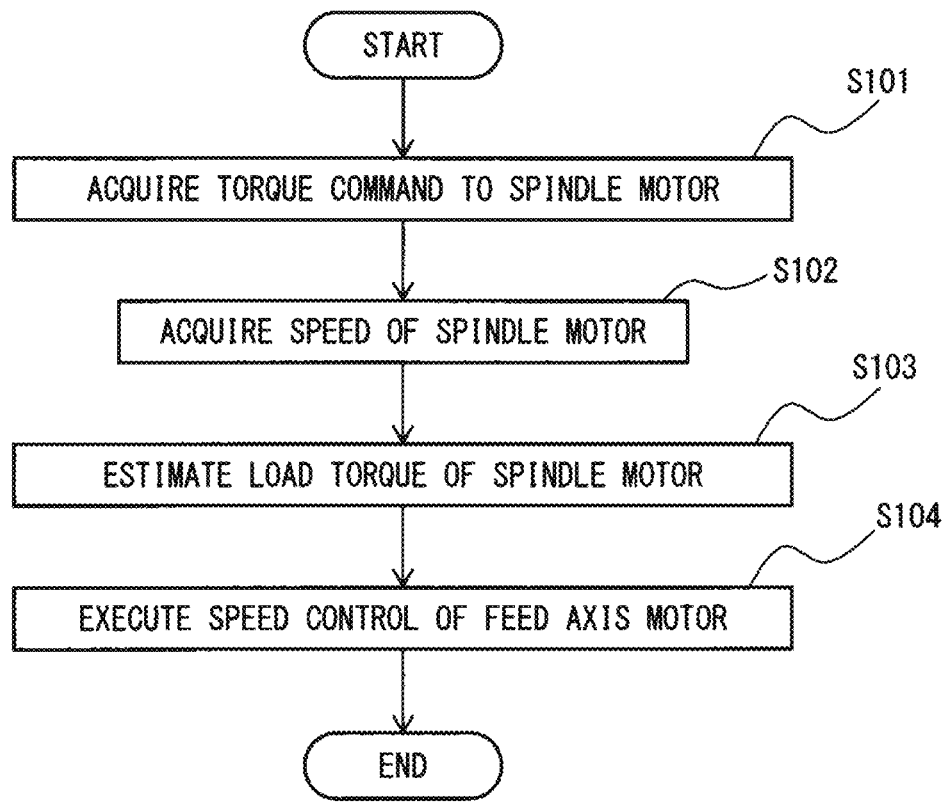
FIG. 4 is a flowchart illustrating an operation flow of the control apparatus of the machine tool according to one embodiment of the present disclosure.

FIG. 4 is a flowchart illustrating an operation flow of the control apparatus of the machine tool according to one embodiment of the present disclosure.

In the state in which the driving of the spindle motor 3 is controlled by the spindle motor control system 20 in the control apparatus 1 of the machine tool, the load torque estimation unit 11 acquires, in step S101, a torque command to the spindle motor 3 from the speed control unit 23 in the spindle motor control system 20.

In step S102, the load torque estimation unit 11 acquires the speed of the spindle motor 3 from the encoder 31. Note that step S101 and step S102 may be executed in reverse order.

In step S103, the load torque estimation unit 11 estimates a load torque acting on the spindle motor 3, based on the torque command to the spindle motor 3 that drives the spindle axis of the machine tool, and the speed of the spindle motor 3.

In step S104, the speed changing unit 12 executes control to change the speed of the feed axis motor 2, in such a manner that the load torque estimated by the load torque estimation unit 11 follows a prescribed load torque target value. To be more specific, the speed changing unit 12 calculates a difference between the load torque target value and the estimated load torque acquired from the load torque estimation unit 11, and generates such a speed command to the feed axis motor 2 as to decrease the difference to zero. The speed command for changing the speed of the feed axis motor 2, which is generated by the speed changing unit 12, is sent to the speed control unit 16, and control to change the speed (rotational speed) of the feed axis motor 2 is executed based on the speed command.

In this manner, according to the present embodiment, in a machine tool including a spindle axis which is driven by a spindle motor and a feed axis which is driven by a feed axis motor, since the load torque of the spindle motor can be kept at a desired value, both the avoidance of breakage of a tool and occurrence of abnormality of a work due to an increase of the load torque on the spindle motor and the enhancement of processing efficiency of the machine tool can be consistently achieved.

Next, a description will be given of the changing process of the control gain of the speed changing unit 12 by the first gain changing unit 13 and the changing process of the gain of the load torque estimation unit 11 by the second gain changing unit 14. Table 1 illustrates a relationship between the speed of the spindle motor 3 or the frequency of processing disturbance, and the filter gain of the load torque estimation unit 11 and the gain of the speed changing unit 12, in the changing process of the control gain of the speed changing unit 12 by the first gain changing unit 13 and the changing process of the gain of the load torque estimation unit 11 by the second gain changing unit 14.

TABLE 1

|  | Load torque estimation unit | Speed changing unit |
| --- | --- | --- |
| Frequency of processing disturbance: Low (Speed of Spindle motor) | Filter gain: Small (Time constant: Large) | Gain: Small |
| Frequency of processing disturbance: High (Speed of Spindle motor) | Filter gain: Large (Time constant: Small) | Gain: Large |

The first gain changing unit 13 changes control gains $K_i$ and $K_p$ which are used for the changing of the speed of the feed axis motor 2 in the speed changing unit 12, in accordance with the speed of the spindle motor 3, or the frequency of processing disturbance that is a value calculated by multiplying the speed of the spindle motor 3 by the number of blades of the tool 4 provided on the spindle axis. For example, when the control gains $K_i$ and $K_p$ are changed in accordance with the speed of the spindle motor 3, the first gain changing unit 13 needs to increase (quicken) the responsivity of control on the feed axis motor 2 as the speed of the spindle motor 3 is faster (higher), and thus the first gain changing unit 13 sets the control gains $K_i$ and $K_p$ to large values. For example, the control gains $K_i$ and $K_p$ may be changed in accordance with the frequency of processing disturbance that is a value calculated by multiplying the speed of the spindle motor 3 by the number of blades of the tool 4 provided on the spindle axis. Since the spindle axis on which the tool 4 is provided is rotated by the spindle motor 3, a load torque of a frequency, which is calculated by multiplying the speed of the spindle motor 3 by the number of blades of the tool 4, occurs on the spindle motor 3 as processing disturbance. Thus, since the first gain changing unit 13 needs to increase (quicken) the responsivity of control on the feed axis motor 2 as the frequency of processing disturbance (load torque) on the spindle motor 3 is higher, the first gain changing unit 13 sets the control gains $K_i$ and $K_p$ to large values.

In addition, the second gain changing unit 14 changes gains $K_1$ and $K_2$ which are used for the estimation of the load torque in the load torque estimation unit 11, in accordance with the speed of the spindle motor 3, or the frequency of processing disturbance that is a value calculated by multiplying the speed of the spindle motor 3 by the number of blades of the tool 4 provided on the spindle axis. The control gains $K_1$ and $K_2$, which are used for the estimation of the load torque, are changed by changing a time constant of a filter gain in the load torque estimation unit 11. For example, when the gains $K_1$ and $K_2$ are changed in accordance with the speed of the spindle motor 3, the responsivity of an estimated load torque needs to be increased as the speed of the spindle motor 3 is faster (higher), and thus the second gain changing unit 14 sets the gains $K_1$ and $K_2$ to large values (i.e. sets the time constant of the filter gain to a small value). As the time constant of the filter gain is smaller, the averaging time of the filter is shorter. Since the responsivity does not need to be increased when the speed of the spindle motor 3 is slow (low), the gains $K_1$ and $K_2$ are set to small values (i.e. the time constant of the filter gain is increased) and the stability is enhanced. For example, the gains $K_1$ and $K_2$ may be changed in accordance with the frequency of processing disturbance that is a value calculated by multiplying the speed of the spindle motor 3 by the number of blades of the tool 4 provided on the spindle axis. In this case, the second gain changing unit 14 needs to enhance (quicken) the responsivity of control on the feed axis motor 2 as the frequency of the processing disturbance (load torque) on the spindle motor 3 is higher, and thus the second gain changing unit 14 sets the gains $K_1$ and $K_2$ to large values (i.e. sets the time constant of the filter gain to a small value).

Note that when the speed of the spindle motor 3 is slow (low), only the control gains $K_i$ and $K_p$ of the speed changing unit may be changed to small values by the first gain changing unit 13, without the filter gain of the load torque estimation unit 11 being changed to a small value by the second gain changing unit 14.

Figure 5:
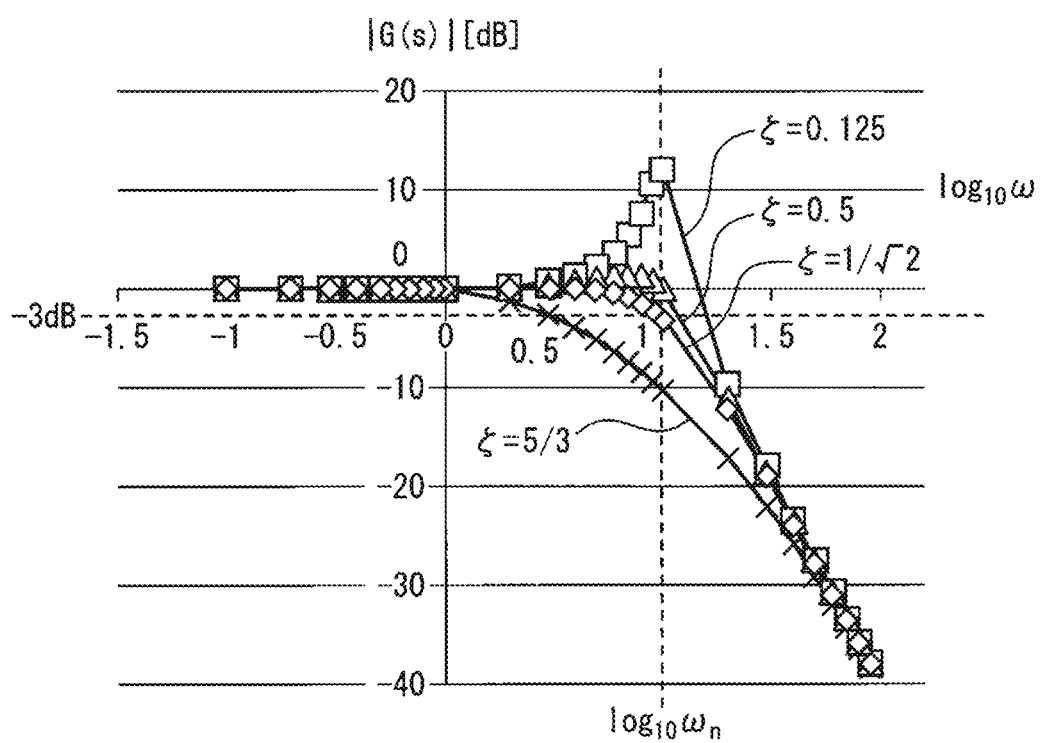
FIG. 5 is a view exemplarily illustrating a relationship between a gain by a second gain changing unit and a cutoff frequency in the control apparatus of the machine tool according to one embodiment of the present disclosure.

FIG. 5 is a view exemplarily illustrating a relationship between a gain by the second gain changing unit and a cutoff frequency in the control apparatus of the machine tool according to one embodiment of the present disclosure.

When a transfer function, which is used for the estimation of the load torque in the load torque estimation unit 11, is $G(s)$, a cutoff frequency $\omega_n$ and an attenuation coefficient $\zeta$, which are based on the filter gain time constant in the load torque estimation unit 11, can be expressed as in equation 5 below.

[Math. 5]

$$G(s) = \left(\frac{K_2}{s^2 + K_1 s + K_2}\right) = \frac{\omega_n^2}{s^2 + 2\zeta\omega_n s + \omega_n^2} \quad (5)$$

where $$\zeta = \frac{K_1}{2\sqrt{K_2}}$$

$$\omega_2 = \sqrt{K_2}$$

When the gains $K_1$ and $K_2$, which are used for the estimation of the load torque in the load torque estimation unit 11, are set, the cutoff frequency $\omega_n$ is first set by adjusting the gain $K_2$. Then, by adjusting the gain $K_1$, the attenuation coefficient $\zeta$ is adjusted to become closer to $1/\sqrt{2}$. FIG. 5 illustrates a case where $\zeta$ is "0.125", "0.5", "$1/\sqrt{2}$", and "5/3".

Note that the gains $K_1$ and $K_2$ in the load torque estimation unit 11 and the control gains $K_i$ and $K_p$ in the speed changing unit 12 are basically unchanged while the machine tool, which the control apparatus 1 controls, is processing an identical product.

However, in the case of processing an identical product, when a speed command to the spindle motor 3 has been changed or a load torque target value to the spindle motor 3 is changed, the changing process of the control gain of the speed changing unit 12 by the first gain changing unit 13 and the changing process of the gain of the load torque estimation unit 11 by the second gain changing unit 14 are executed. For example, the speed command to the spindle motor 3 has been changed, the first gain changing unit 13 and second gain changing unit 14 detect the change of the speed command, for example, from an operation program of the spindle motor 3, and automatically execute the above-described changing processes. In addition, for example, when the load torque target value to the spindle motor 3 is changed, the first gain changing unit 13 and second gain changing unit 14 detect the change of the load torque target value from the upper-level numerical control apparatus (not illustrated), and automatically execute the above-described changing processes.

Further, when the tool 4 of the machine tool which the control apparatus 1 controls has been changed, or when a product which the machine tool processes has been changed, the changing process of the control gain of the speed changing unit 12 by the first gain changing unit 13 and the changing process of the gain of the load torque estimation unit 11 by the second gain changing unit 14 are executed. For example, the first gain changing unit 13 and second gain changing unit 14 receive, from the upper-level numerical control apparatus, a notification relating to the change of the tool 4 or the change of the product which the machine tool processes, and automatically execute the above-described changing processes.

The changing processes may be automatically executed when a worker performed a predetermined operation via an input device such as a touch panel or an operation key of the upper-level numerical control apparatus (not illustrated).

As described above, in the present embodiment, by executing the changing process of the control gain of the speed changing unit 12 by the first gain changing unit 13 and the changing process of the gain of the load torque estimation unit 11 by the second gain changing unit 14, the load torque of the spindle motor can properly be kept at a desired value.

According to one aspect of the present disclosure, in a machine tool including a spindle axis which is driven by a spindle motor and a feed axis which is driven by a feed axis motor, a control apparatus, which can keep a load torque on the spindle motor at a desired value, can be realized.

The invention claimed is:

1. A control apparatus of a machine tool, comprising:
 a load torque estimation unit configured to estimate a load torque acting on a spindle motor, based on a torque command to the spindle motor which drives a spindle axis of the machine tool, and a speed of the spindle motor;
 a speed changing unit configured to change a speed of a feed axis motor such that the load torque estimated by the load torque estimation unit follows a prescribed load torque target value; and
 a gain changing unit configured to change at least one of (1) a control gain for changing the speed of the feed axis motor in the speed changing unit, or (2) a gain for estimating the load torque in the load torque estimation unit.

2. A control apparatus of a machine tool, comprising:
 a load torque estimation unit configured to estimate a load torque acting on a spindle motor, based on a torque command to the spindle motor which drives a spindle axis of the machine tool, and a speed of the spindle motor;
 a speed changing unit configured to change a speed of a feed axis motor such that the load torque estimated by the load torque estimation unit follows a prescribed load torque target value; and
 a first gain changing unit configured to change a control gain which is used for the changing of the speed of the feed axis motor in the speed changing unit, in accordance with the speed of the spindle motor or a frequency of processing disturbance that is a value calculated by multiplying the speed of the spindle motor by the number of blades of a tool provided on the spindle axis.

3. A control apparatus of a machine tool, comprising:
 a load torque estimation unit configured to estimate a load torque acting on a spindle motor, based on a torque command to the spindle motor which drives a spindle axis of the machine tool, and a speed of the spindle motor;
 a speed changing unit configured to change a speed of a feed axis motor such that the load torque estimated by the load torque estimation unit follows a prescribed load torque target value; and
 a second gain changing unit configured to change a gain which is used for the estimating of the load torque in the load torque estimation unit, in accordance with the speed of the spindle motor or a frequency of processing disturbance that is a value calculated by multiplying the speed of the spindle motor by the number of blades of a tool provided on the spindle axis.

* * * * *